US 6,707,791 B1

(12) United States Patent
Sundqvist

(10) Patent No.: US 6,707,791 B1
(45) Date of Patent: Mar. 16, 2004

(54) INTERNET PROTOCOL STACK FOR REAL TIME APPLICATIONS

(75) Inventor: Jim Sundqvist, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/349,674

(22) Filed: Jul. 8, 1999

(51) Int. Cl.[7] ............................. H04L 3/14; H04J 3/16
(52) U.S. Cl. .................... 370/230.1; 370/231; 370/235; 370/469; 370/493
(58) Field of Search ................. 370/231, 235, 370/465, 468, 230, 230.1, 252, 253, 419, 420, 463, 469, 493

(56) References Cited

U.S. PATENT DOCUMENTS

| 4,238,851 A | 12/1980 | Takahashi et al. |
| 4,570,257 A | 2/1986 | Olson et al. |
| 4,581,734 A | 4/1986 | Olson et al. |
| 4,581,735 A | 4/1986 | Flamm et al. |
| 4,623,886 A | 11/1986 | Livingston |
| 4,677,612 A | 6/1987 | Olson et al. |
| 4,707,693 A | 11/1987 | Hessel |
| 5,432,790 A | 7/1995 | Hluchyj et al. |
| 5,477,542 A | 12/1995 | Takahara et al. |
| 5,553,061 A | 9/1996 | Waggener, Jr. et al. |
| 5,557,608 A | 9/1996 | Calvignac et al. |
| 5,623,483 A | 4/1997 | Agrawal et al. |
| 6,038,601 A * | 3/2000 | Lambert et al. ............. 709/226 |
| 6,438,105 B1 * | 8/2002 | Qarni et al. ................. 370/231 |
| 6,438,136 B1 * | 8/2002 | Bahl ........................... 370/458 |

FOREIGN PATENT DOCUMENTS

WO    WO 97/41674    11/1997

OTHER PUBLICATIONS

Proceedings of the IEEE Real–Time Systems Symposium, New York, USA, "Structuring Communication Software for Quality–of–Service Guarantees", A. Mehra et al., vol. SYMP. 17, pps. 144–154, XP000659639, ISBN 0–7803–3801–4.

* cited by examiner

Primary Examiner—Dang Ton
Assistant Examiner—Ronald Abelson

(57) ABSTRACT

A source encoder schedules its access to a network IP stack. During that scheduled period, the source encoder blocks the transport of non-real-time TCP and UDP packets. After at least one real-time packet has been transported through the stack, the source encoder allows the non-real-time packets to access the physical layer until the beginning of the next scheduled period. Consequently, the packet transport delay is reduced significantly, which results in a substantial increase in throughput.

8 Claims, 2 Drawing Sheets

1 speech frame $\Delta T_3$ = TIME RESERVED TO TRANSMIT SPEECH FRAME FORMED AT $T_0$.

INTERNET PROTOCOL STACK FOR REAL TIME APPLICATIONS

BACKGROUND OF THE INVENTION

1. Technical Field of the Invention

The present invention relates in general to the telecommunications field and, in particular, to an Internet Protocol (IP) stack which is suitable for use with real-time telecommunications applications.

2. Description of Related Art

There is a significant need to improve the perceived quality of real-time communications for end users. For example, the perceived quality of such real-time applications as audio or video communications connected with packet-based networks that allow mixed services (e.g., voice, video, data, file sharing, etc.) needs to be improved. A good example of such a packet-based network that allows mixed services is the IP network typically used in the Internet and many companies' intranets.

Today's implementation of telephony over IP-based networks has developed into a multi-million dollar industry, wherein data communication companies such as Microsoft, Intel and 3Com are competing with traditional telecommunication companies such as Ericsson, Nokia and Lucent to market their respective products to the network operators. The network operators are not only the traditional companies such as Telia and Telstra, but they also include new companies entering this field, such as Delta Three and Telecom Finland which offer end users low-cost telephony services over IP-based networks. The lower cost for IP-telephony service results from the fact that IP-based communications equipment is less costly than traditional circuit-switched communications equipment. The reduction in costs for the IP-based equipment is due to the large mass market for IP products offered by different vendors, and the less complex components required for the IP-based equipment to complete their assigned tasks.

The typical end user has a great deal of confidence in the traditional telephony services that utilize circuit-switched networks. Users of these services seldom experience dropped calls or blocked calls due to a network overload. Also, the perceived quality of these traditional telephony services is relatively stable. Consequently, in order for IP-based network telephony services to become strongly competitive with the traditional telephony services, the end users will have to receive IP-based services which are similar in both reliability and quality to the traditional services being provided. However, an end user might discount such attractive features if other benefits are made available, such as, for example, lower costs or higher mobility. In fact, the advantages of higher mobility are the primary reasons why the cellular telephony field has grown enormously during the past few years.

From an end user's point of view, the perceived quality of the telephony services being provided depends on the end-to-end delay and packet losses experienced between the source encoder and decoder. Notably, a packet is assumed to be lost if it is delayed in reaching the decoder for more than a specified period. As such, it is desirable to keep the end-to-end delay as short as possible in all interactive applications (e.g., especially for telephony). A shorter delay improves the conversation possibilities when two persons are talking to each other. A shorter delay also reduces the complexity of the echo cancellers being used, because an echo associated with a shorter delay is less annoying to an end user. Consequently, less cancellation of the echo is needed (i.e., less complex cancellation algorithm). For example, echoes can occur whenever a mismatch exists somewhere in the analog part of the network. Also, echoes can be caused by acoustical coupling between an audio output stage (loudspeaker) and input stage (microphone) of a cellular phone.

As such, the end-to-end delay from an audio input stage to an audio output stage is illustrated by the following delay budget: (1) source encoder delay (including encoder look-ahead); (2) source encoder processing delay; (3) source encoder analysis data packetizing delay; (4) network access delay; (5) network transportation delay; (6) decoder unpacking delay; and (7) decoder synthesis delay. Each of these seven delay segments can introduce an addition to the end-to-end delay, and all of these segments except the source encoder delay (1) can introduce variations to the delay. At the decoder side, a terminal should be able to compensate for the end-to-end delay and the delay variations, or the transmitted packets from the encoder side will be lost.

Terminals used in IP-based networks typically have IP stacks implemented as shown in FIG. 1. As illustrated by FIG. 1, there are various network bearers of IP packets (physical layer), including the Ethernet (most commonly used transport media for IP packets), Asynchronous Transfer Mode (ATM) networks, and wireless network bearers such as the data channels of the Global System for Mobile Communications (GSM) or the packet-based General Packet Radio Service (GPRS). Above the physical layer, the IP (network layer) performs two functions: addressing and fragmentation.

Above the physical layer is the transport layer. In that layer, the Telecommunications Control Protocol (TCP) is connection-oriented between two end-points, and thereby supports the re-transmission of packets which are lost in the chain between the two end-points. The User Datagram Protocol (UDP) is connection-less and used, for example, in real-time applications where re-transmissions would be useless because of the real-time requirements imposed.

IP-telephony applications can be executed in the application layer. An IP-telephony application performs a call setup procedure over the transport layer using the TCP, because it is important that the call be correctly connected. As soon as the connection is established, the application switches over to use the UDP for transmitting speech packets in real-time. As such, the IP stack is a unique resource at an end-point, and several applications can share the IP stack through addressing using the transport layer protocol.

A significant problem that exists for terminals with an IP stack implementation is that the stack functions in accordance with a first-in-first-out (FIFO) scheme, which can lead to undesirable results. For example, several different applications can share the same IP stack. Consequently, TCP packets, which have different real-time requirements than the UDP which is carrying interactive voice packets, can delay the transport of real-time packets through the network stack. Notably, this problem is exacerbated when the physical layer has limited bandwidth.

To illustrate such a problem, assume that a terminal is being used in a GPRS system with a maximum bit rate of 115 kbits/s. Also, assume that the terminal is providing a GSM (or similar system) speech service using a 13 kbits/s coder/decoder (codec). Every 20 ms, the codec packetizes the speech data into 260 bit packets for transmission over the radio channel. Simultaneously, the terminal's user initiates the transmission of a data file over the radio link. If the maximum packet size needed to obtain a reasonable payload is 132 bytes long (4 bytes and 128 bytes for compressed header and application data, respectively), it takes about 10 ms to transmit the packet containing the data file. If this data packet reaches the IP stack before the speech packet does (with its real-time requirements), the transport of the speech packet will be unnecessarily delayed. This additional transport delay of the speech packet becomes more severe for channels with lower bandwidths, or systems that utilize larger packets. In fact, an additional delay of 10 ms is relatively large compared to a delay requirement of less than 2 ms per router hop or 5–6 $\mu$s/km for transmissions between routers. As described in detail below, the present invention successfully resolves these delay problems and other related problems.

SUMMARY OF THE INVENTION

In accordance with a preferred embodiment of the present invention, a source encoder schedules its access to a network stack. During that scheduled period, the source encoder blocks the transport of non-real-time TCP and UDP packets. After at least one real-time packet has been transported through the stack, the source encoder allows the non-real-time packets to access the physical layer until the beginning of the next scheduled period.

An important technical advantage of the present invention is that the end-to-end delay is reduced significantly.

Another important technical advantage of the present invention is that packet losses are minimized.

Yet another important technical advantage of the present invention is that there is a substantial increase in throughput.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, in accordance with a preferred embodiment of the present invention, a source encoder schedules its access to a network stack. During that scheduled period, the source encoder blocks the transport of non-real-time TCP and UDP packets. After at least one real-time packet has been transported through the stack, the source encoder allows the non-real-time packets to access the physical layer until the beginning of the next scheduled period.

Figure 1:
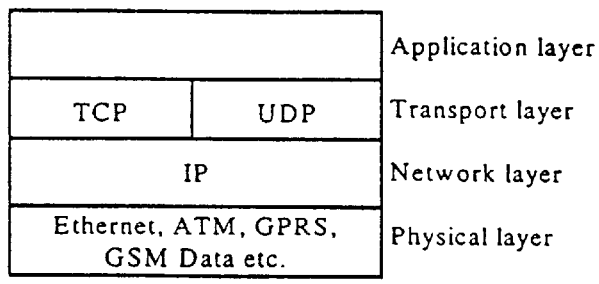
FIG. 1 is a diagram of a conventional IP stack that can be used for a terminal in an IP-based network.
Figure 2:
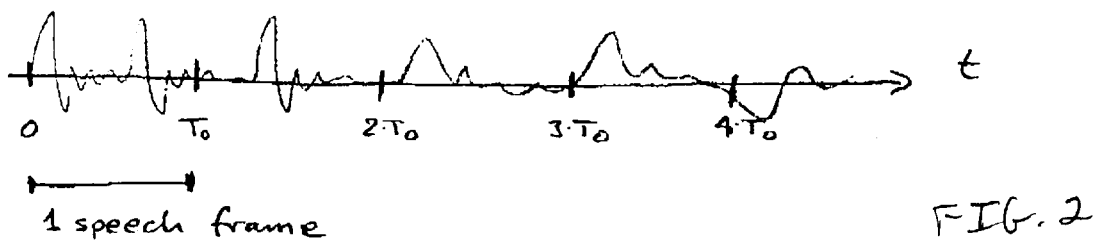
FIG. 2 is an illustration of a signal that is useful for understanding the present invention.
Figure 3:
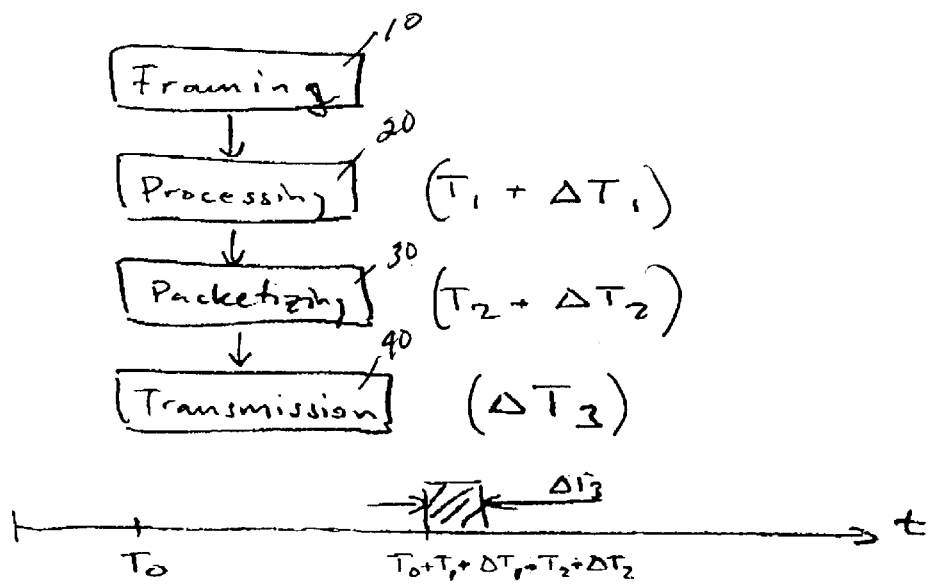
FIG. 3 is a diagram that illustrates the time it takes for an encoder to frame, encode and packetize speech signals into a datagram for transport to the receiving side.

Specifically, FIG. 2 is an illustration of a signal that is useful for understanding the present invention. Referring to FIG. 2, an encoder (not explicitly shown) segments the continuous speech signal into a plurality of frames (typically 20–30 ms). Each frame is encoded with a set of speech parameters, which are then transmitted to the receiving side (decoder). The period of consequence is the amount of time it takes for the encoder to process the speech frame into speech parameters and packetize these speech parameters into a datagram for transport to the receiving side. FIG. 3 is a diagram that illustrates the timing of this process.

Referring to FIG. 3, it should be understood that the time it takes to process a speech frame into speech parameters can vary. For example, assume that the framing process (10) begins at time $T_0$ sec. As such, the time it takes to process a speech frame into speech parameters (20) can be expressed as $T_1+\Delta T_1$ sec. The time it takes to packetize the speech parameters into a datagram (30) also varies and can be expressed as $T_2+\Delta T_2$ sec. Also, the transmission time for sending the datagram to the receiving (decoder) side (40) can vary and depends on the size of the datagram being transmitted. As such, in accordance with the present invention, the transmission unit represented by the expression $T_1+\Delta T_1+T_2+\Delta T_2$ is not to be blocked for a duration of $\Delta T_3$ sec. Since the framing process is periodic, the network scheduling illustrated in FIG. 3 can be repeated continuously for a plurality of frames. As a result of the scheduling described above in accordance with the present invention, real-time data can be scheduled and transported to the network as soon as possible.

Figure 4:
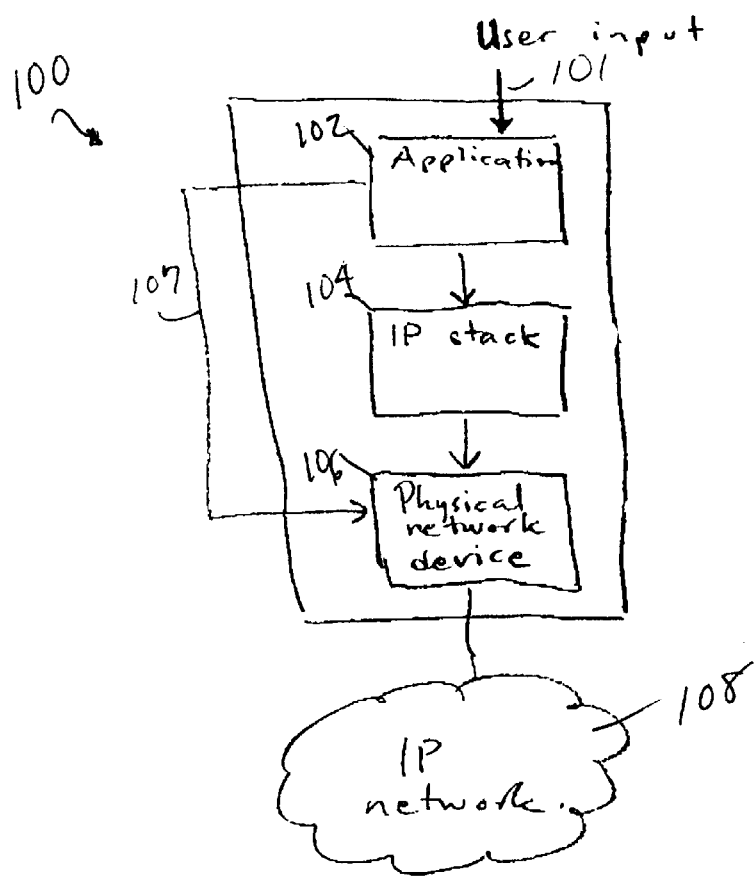
FIG. 4 is a block diagram of an exemplary IP device that can be used with or by a source encoder (or codec) to implement a preferred embodiment of the present invention.

FIG. 4 is a block diagram of an exemplary IP device (100) that can be used with or by a source encoder (or codec) to implement a preferred embodiment of the present invention. For this embodiment, the exemplary IP device 100 can be implemented by an encoder (not explicitly shown) as software and/or hardware. As shown, the IP device 100 includes a software-executed application 102, which functions primarily to frame and encode the user input data 101 (typically speech information). The application 102 is coupled to an IP stack 104, which functions primarily to packetize the encoded parameters (e.g., speech parameters) and form at least one datagram for transmission. The IP stack 104 is coupled to a physical network device 106, which functions to connect the IP device to the physical network (e.g., IP network 108). Notably, the application 102 also functions to control the physical device 106 with control messages sent via control line 107. In this way, in accordance with the preferred embodiment of the present invention, the application 102 enables the source encoder to schedule its access to the network stack, and during the scheduled time period, thereby block the transport of non-real-time packets (e.g., both TCP and UDP packets). As soon as a real-time packet (e.g., including speech) has been transported through the stack, the application 102 controls the network device 106 to again allow the non-real-time packets to access the physical layer, for at least until the beginning of the next scheduled blocking period.

For example, the source encoder can inform the IP device 100 (via application 102) about the encoder's scheduling preferences (e.g., packet interval and maximum allowable local delay variation). By comparing the preferences with the observed real-time packet transport time through the network (e.g., using information fed back from the decoder), the application can use that information to schedule the transport time for the next real-time packet. In this regard, more than one application can be executed in real-time. Consequently, the different sources of the real-time applications can be distinguished (e.g., by analyzing the transport protocol header that separates the real-time sources), and the source encoder can separately schedule access for each real-time application. If two or more real-time services are scheduled to access the network stack at the same time, the following prioritizing scheme can be used, for example: priority 1—voice; priority 2—video; and priority 3—other real-time services.

As an alternative scheduling approach, the source encoder can inform (via application 102) the network stack about the amount of time there is left until a real-time packet reaches the network stack. With this direct timing information, the application can then schedule that real-time packet's access to the network stack.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for scheduling transport of packets in a telecommunications network stack, comprising the steps of:

selecting a predetermined time interval by comparing at least one predetermined scheduling preference with a measured packet transport time and selecting said predetermined time interval responsive to said comparing step;

during said selected predetermined time interval, blocking a transmission of non-real-time packets; and responsive to a determination that at least one real-time packet has been transported through said network stack during said selected predetermined time interval, enabling at least one of said non-real-time packets to access a physical layer of said network stack.

2. The method of claim 1, wherein said telecommunications network stack comprises an IP network stack.

3. The method of claim 1, wherein said packet comprises said real-time packet.

4. The method of claim 1, wherein said selecting step comprises the steps of:

estimating a time for said at least one real-time packet to arrive at said network stack; and selecting said predetermined time interval responsive to said estimating step.

5. An apparatus for scheduling transport of packets in a telecommunications network, comprising:

an application unit;

a protocol stack coupled to said application unit; and a physical network device coupled to said protocol stack and said application unit, wherein said application unit further comprises:

means for selecting a predetermined time interval, wherein said means for selecting comprises means for comparing at least one predetermined scheduling preference with a measured packet transport time and means for selecting said predetermined time interval responsive to an output from said means for comparing;

means for blocking a transmission of non-real-time packets during said selected predetermined time interval; and means for enabling at least one of said non-real-time packets to access a physical layer of said network stack responsive to a determination that at least one real-time packet has been transported through said network stack during said selected predetermined time interval.

6. The apparatus of claim 5, wherein said telecommunications network comprises an IP network.

7. The apparatus of claim 5, wherein said packet comprises said real-time packet.

8. The apparatus of claim 5, wherein said means for selecting comprises:

means for estimating a time for said at least one real-time packet to arrive at said network stack; and means for selecting said predetermined time interval responsive to an output from said means for estimating.

* * * * *